United States Patent
Mansour et al.

(10) Patent No.: US 9,807,770 B1
(45) Date of Patent: Oct. 31, 2017

(54) EFFICIENT USE OF ASSIGNING RESOURCES IN THE UPLINK OF A WIRELESS COMMUNICATION NETWORK

(71) Applicant: Sprint Spectrum LP, Overland Park, KS (US)

(72) Inventors: Nagi A. Mansour, Arlington, VA (US); Michael Erich, Arlington, VA (US)

(73) Assignee: Sprint Spectrum LP, Overland Park, KS (US)

( * ) Notice: Subject to any disclaimer, the term of this patent is extended or adjusted under 35 U.S.C. 154(b) by 157 days.

(21) Appl. No.: 14/099,851

(22) Filed: Dec. 6, 2013

(51) Int. Cl.
  *H04W 72/04* (2009.01)
  *H04L 5/00* (2006.01)

(52) U.S. Cl.
  CPC ....... *H04W 72/0466* (2013.01); *H04L 5/0053* (2013.01)

(58) Field of Classification Search
  None
  See application file for complete search history.

(56) References Cited

U.S. PATENT DOCUMENTS

| | | | |
|---|---|---|---|
| 7,787,885 B1 * | 8/2010 | Mansour | H04J 13/0003 370/203 |
| 8,111,609 B2 * | 2/2012 | Wei | H04L 5/0044 370/208 |
| 8,379,738 B2 | 2/2013 | Pi et al. | |
| 8,837,271 B1 * | 9/2014 | Mansour | H04L 5/003 370/208 |
| 2006/0120274 A1 * | 6/2006 | Mansour | H04J 13/0048 370/209 |
| 2006/0245472 A1 * | 11/2006 | Pan | H04L 5/026 375/144 |
| 2010/0067461 A1 * | 3/2010 | Kwak | H04L 1/0026 370/329 |
| 2010/0284292 A1 * | 11/2010 | You | H04W 72/048 370/252 |
| 2011/0249647 A1 * | 10/2011 | Chen | H04L 1/1812 370/329 |
| 2014/0098751 A1 * | 4/2014 | Luo | H04W 72/042 370/329 |
| 2014/0133331 A1 * | 5/2014 | Fu | H04L 5/00 370/252 |
| 2014/0169328 A1 * | 6/2014 | Ahimezawa | H04B 7/0452 370/330 |

FOREIGN PATENT DOCUMENTS

| | | | | |
|---|---|---|---|---|
| WO | WO 2006044422 A2 * | 4/2006 | | H04J 13/0048 |
| WO | WO 2006062556 A1 * | 6/2006 | | H04J 13/0048 |

* cited by examiner

*Primary Examiner* — Robert C Scheibel (57) ABSTRACT

Systems and methods for assigning resources in a wireless communication system are provided. First data addressed to a first wireless device can be encoded by multiplying the first data with a first masking code. In addition, second data addressed to a second wireless device can be encoded by multiplying the second data with a second masking. The encoded first data can be assigned to a first resource element of a resource block. The encoded second data can be assigned to a second resource element of the resource block. Alternatively, the encoded first and second data can be assigned to the same resource element of a single resource block. The resource block can be transmitted to the first wireless device and the second wireless device.

18 Claims, 6 Drawing Sheets

EFFICIENT USE OF ASSIGNING RESOURCES IN THE UPLINK OF A WIRELESS COMMUNICATION NETWORK

TECHNICAL BACKGROUND

Wireless communication can be used as a means of accessing a communication network. Wireless communication has certain advantages over wired communications for accessing a network. For example, implementing a wireless interface can eliminate a need for a wired infrastructure thereby reducing the cost of building and maintaining network infrastructure. In addition, a wireless network can support added mobility by allowing a wireless device to access the network from various locations or addresses. A wireless interface can comprise at least one transceiver in active communication with another transceiver that is connected to the network.

To facilitate wireless communications, telecommunication organizations have adopted various standards throughout the world. For example, the Institute of Electrical and Electronics Engineers (IEEE) has promulgated a number of wireless standards such as the 802.11 (WiFi) standards and the 802.16 (WiMAX) standards. The International Telecommunication Union (ITU) has promulgated standards to facilitate wireless communications such as TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication within a network including processes for registering on the network, carrier modulation, frequency bands of operation, message formats, etc.

Wireless communication can be used in various applications including cellular and telemetry networks. Telemetry networks can support machine to machine communication, supervisory control and data acquisition (SCADA), and radio-frequency identification such as the "Internet of Things." However, in telemetry networks, the amount of data transferred between a wireless device and the network can be significantly less than the resources allocated for each transmission. Underutilized resources can increase overhead transmissions and cause an undesirable deterioration in communication.

Overview

Systems and methods for assigning resources in a wireless communication system are provided. First data addressed to a first wireless device can be encoded by multiplying the first data with a first masking code. In addition, second data addressed to a second wireless device can be encoded by multiplying the second data with a second masking code different from the first masking code. The encoded first data can be assigned to a first resource element of a resource block. The encoded second data can be assigned to a second resource element of the resource block. The resource block can be transmitted to the first wireless device and the second wireless device.

DETAILED DESCRIPTION

Figure 1:
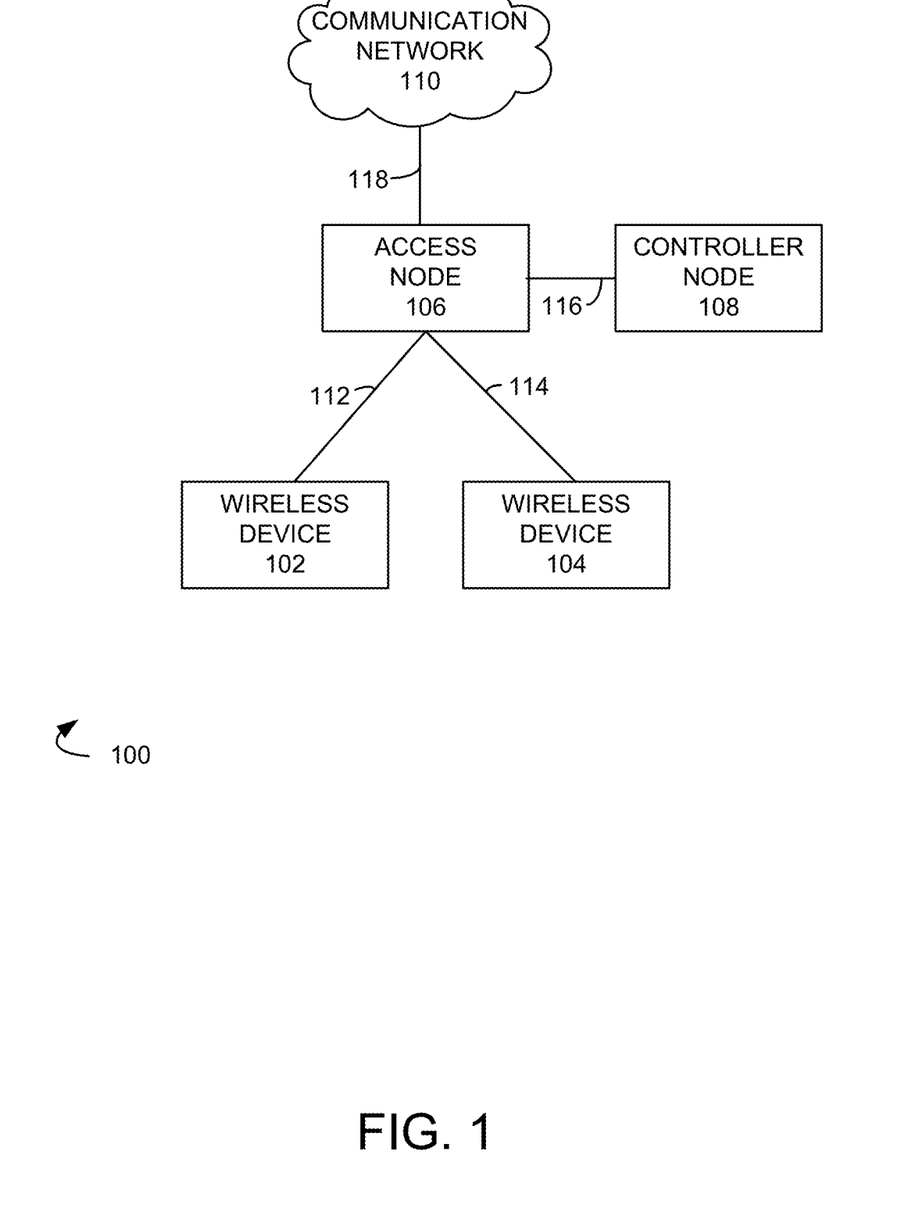
FIG. 1 illustrates a communication system to assign resources in a wireless communication network.

FIG. 1 illustrates an exemplary communication system 100 for assigning resources in a wireless communication network. Communication system 100 can comprise wireless devices 102, 104, access node 106, controller node 108, and communication network 110. Other network elements may be present in the communication system 100 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access node 106 and communication network 110, which are omitted for clarity, including additional processing nodes, routers, gateways, and physical and/or wireless data links for carrying data among the various network elements.

Wireless devices 102, 104 can be any device configured to communicate over communication system 100 using a wireless interface. For example, wireless devices 102, 104 can include a remote terminal unit, a cell phone, a smart phone, a computing platform such as a laptop, palmtop, or a tablet, a personal digital assistant, or an internet access device, and combinations thereof. It is noted that while two wireless devices are illustrated in FIG. 1 as being in communication with access node 106, any number of wireless devices can be implemented according to various exemplary embodiments disclosed herein.

The wireless interface of wireless devices 102, 104 can include one or more transceivers for transmitting and receiving data over communication system 100. Each transceiver can be associated with a different frequency bands, the same or different radio access technologies, and/or the same or different network providers. For example, wireless devices 102, 104 can include a transceiver associated with at least one wireless cellular protocol and/or other types of wireless communication. For example, a transceiver can be associated with code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (WiFi), Bluetooth, Zigbee, infrared data association (IrDA), etc.

Wireless device 102 can be in communication with access node 106 through communication link 112. Wireless device 104 can be in communication with access node 106 through communication link 114. Links 112, 114 can use various communication media, such as air, space, metal, optical fiber, or some other signal propagation path—including combinations thereof. Communication links 112, 114 may comprise many different signals sharing the same link. Communication links 112, 114 could include multiple signals operating in a single "airpath" comprising beacon signals, user communications, communication sessions, overhead communications, frequencies, timeslots, transportation ports, logical transportation links, network sockets, packets, or communication directions. For example, user communications between wireless devices 102, 104 and access node 106 could share the same representative wireless link, but be transferred over different communication sessions, frequencies, timeslots, packets, ports, sockets, logical transport links, or in different directions—including combinations thereof.

Wireless devices 102, 104 can communicate information over system 100 using various communication services. These services can include various voice and/or data services and applications. For example, mobile voice services, mobile data services, push-to-talk services, internet services, web browsing, email, pictures, picture messaging, video, video messaging, audio, voicemail, music, MP3's, ring tones, stock tickers, new alerts, etc.

Access node 106 can be any network node configured to provide communication between wireless devices 102, 104 and communication network 110. For example, access node 106 can be selected from a base transceiver station, a radio base station, an eNodeB device, or an enhanced eNodeB device, SCADA control host, or the like. It is noted that while only one access node 106 is illustrated in FIG. 1, any number of access nodes can be implemented within system 100.

Access node 106 can comprise a processor and associated circuitry to execute or direct the execution of computer-readable instructions to obtain information. Access node 106 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 106 can receive instructions and other input at a user interface.

Controller node 108 can be any network node configured to communicate information or control information over system 100. Controller node 108 can be a standalone computing device, computing system, or network component, and can be accessible, for example, by a wired or wireless connection, or through an indirect connection such as through a computer network or communication network. For example, controller node 108 can include a mobility management entity (MME), a serving gateway (SGW), a public data network gateway (PGW), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 108 is not limited to any specific technology architecture, such as Long Term Evolution (LTE) and can be used with any network architecture and/or protocol.

Controller node 108 can comprise a processor and associated circuitry to execute or direct the execution of computer-readable instructions to obtain information. Controller node 108 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 108 can receive instructions and other input at a user interface.

Controller node 108 can be in communication with access node 106 through communication link 116. Access node 106 can be in communication with communication network 110 through communication link 118. Communication links 116, 118 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 116, 118 can be a direct link or might include various equipment, intermediate components, systems, and networks.

Communication network 110 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 110 can be capable of carrying data, for example, to support voice, push-to-talk, and data communications by a wireless device such as wireless devices 102, 104. Wireless network protocols can comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 110 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 110 can also comprise additional base stations, controller nodes, telephony switches, internet routers, network gateways, computer systems, communication links, or some other type of communication equipment, and combinations thereof.

Data communicated within a network can be assigned transmission resources using an organization based on resource elements or symbols. Transmission resources can be assigned or scheduled using various channel access methods such as frequency division multiple access (FDMA), time division multiple access (TDMA), packet mode multiple access, code division multiple access (CDMA), spread spectrum multiple access (SSMA), space division multiple access (SDMA), etc.

In operation, data communicated within system 100 can be assigned resources such that data transmitted from a plurality of wireless devices to an access node can be assigned within the same resource block. For example, wireless devices 102, 104 can encode data to be transmitted to a network node such as access node 106 by multiplying different masking codes to the data to be transmitted from the respective wireless devices 102, 104. Masking codes can be used to scramble or encrypt the data to be transferred from the wireless devices 102, 104 and can be XOR'd with the data such that the data is secure and cannot be decoded by any device except the device receiving the data. The masking scheme used to encode the data transmitted from wireless device 102 can be different from the masking scheme used to encode the data transmitted from wireless device 104. In an exemplary embodiment, the masking code associated with wireless device 102 can be orthogonal to the masking code associated with wireless device 104.

The wireless devices 102, 104 can assign the encoded data to the same or different resource elements of a single resource block. For example, data to be transmitted from wireless devices 102, 104 can be assigned the same resource element of a single resource block. In an exemplary embodiment, the data to be transmitted from wireless devices 102, 104 can be assigned to one or more resource elements of a single resource block. When the data is assigned to a plurality of resource elements, the resource elements can be a set of resource elements such that the resource elements are adjacent within the resource block. Alternatively, the data to be transmitted can be assigned to a plurality of resource elements that are non-sequential such that one or more of the resource elements are not adjacent within the resource block.

In another alternative embodiment, data transmitted from the wireless devices 102, 104 can be assigned different resource elements within the same resource block. When data is assigned to different resource elements within the same resource block, the assigned resource elements can be within the same subcarrier of the resource block or within different subcarriers of the resource block. The resource block can be transmitted over a wireless interface from wireless device 102 and wireless device 104 to access node 106 where access node 106 can decode the resource block using the respective masking codes to generate the data transmitted from wireless device 102 and wireless device 104. While the above described method could be indicative of uplink transmission, one of ordinary skill in the art would recognize that the method could be used for either uplink or downlink transmissions.

Figure 2:
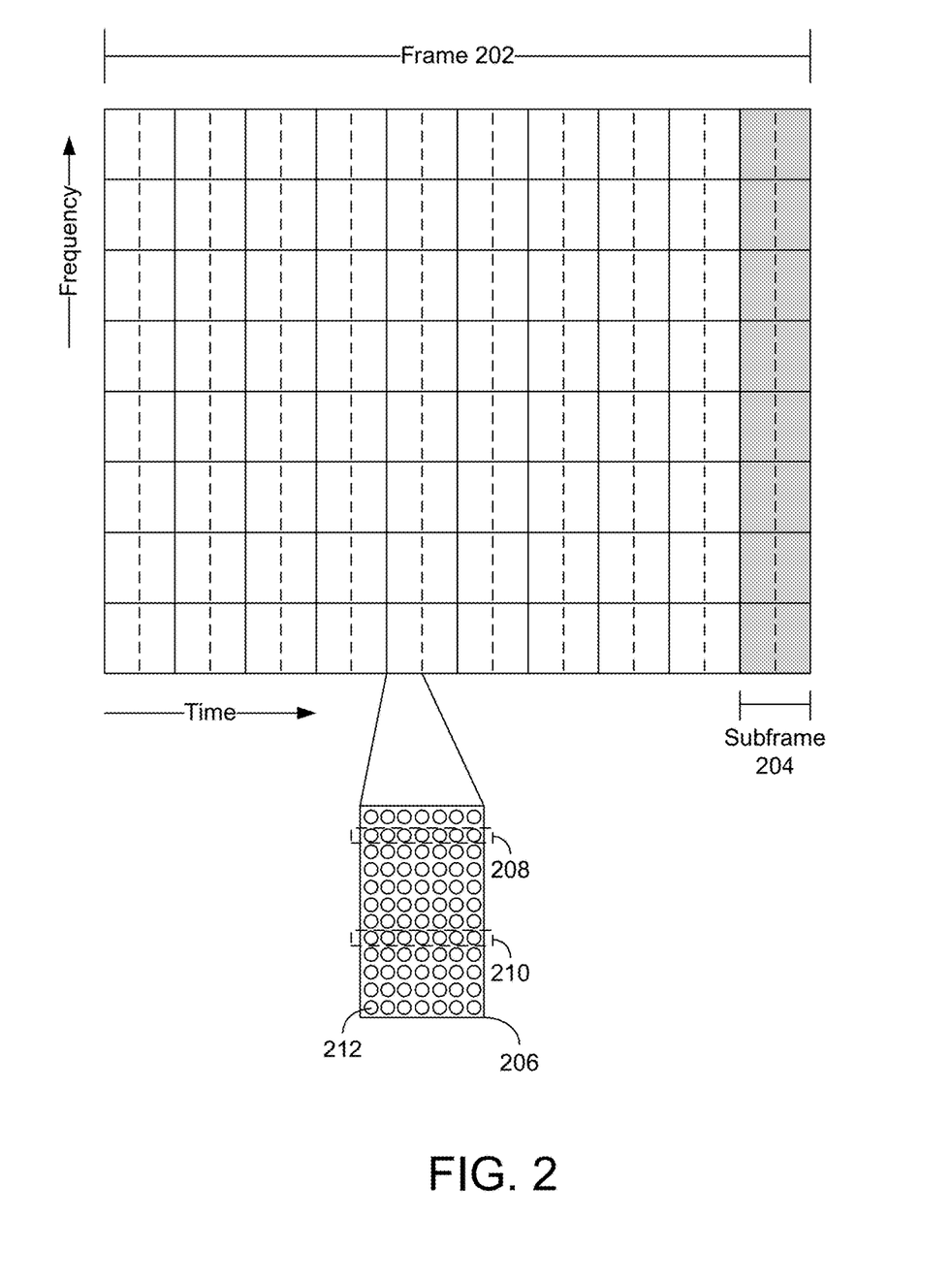
FIG. 2 illustrates an exemplary data transmission frame according to an exemplary embodiment of the present disclosure.

FIG. 2 illustrates an exemplary data transmission frame 202 according to an exemplary embodiment of the present invention. Frame 202 can be generated using a channel access method such as an orthogonal frequency division multiple access scheme (OFDMA). For example, a network node can assign resource elements 212 indicative of data to be transmitted using a wireless interface within a resource block 206 where resource block 206 comprises a resource elements distributed among a predetermined number of subcarriers 208, 210 over a predetermined time period using OFDMA.

As illustrated in FIG. 2, frame 202 can comprise a plurality of subframes where each subframe 204 comprises a predetermined number of resource blocks 206 or slots. The number of resource blocks available per unit of time is based on the bandwidth of the system. Moreover, each resource block 206 can comprise a predetermined number of subchannels 208, 210 where the number of subchannels per resource block is also based on the bandwidth of the system. For example, a system having a bandwidth of 1.25 MHz can comprise 76 subcarriers per unit of time, a system having a bandwidth of 2.5 MHz can comprise 150 subcarriers per unit of time, a system having a bandwidth of 5 MHz can comprise 300 subcarriers per unit of time, a system having a bandwidth of 10 MHz can comprise 600 subcarriers per unit of time, a system having a bandwidth of 15 MHz can comprise 900 subcarriers per unit of time, and a system having a bandwidth of 20 MHz can comprise 1200 subcarriers per unit of time.

For clarity and ease of illustration, FIG. 2 illustrates sixteen resource blocks per unit of time where a unit of time is represented by a column of parallel subframes (e.g. the shaded region represents one unit of time) and each subframe comprises two resource blocks. In addition, resource block 206 is illustrated as having twelve subchannels. This illustration is representative and should not be considered limiting. One of ordinary skill in the art would recognize that the number of subframes per unit of time, the number of resource blocks per subframe, and the number of subchannels per resource block are directly related to the bandwidth of the system and may be different than illustrated.

Wireless device 102 and/or wireless device 104 can encode data to be transmitted to a network node and assign the encoded data to resource elements of a resource block 206. For example, data transmitted from wireless device 102 can be multiplied with a first masking code associated with wireless device 102 and data transmitted from wireless device 104 can be multiplied with a second masking code different from the first masking code associated with wireless device 104. The wireless devices 102, 104 can assign the encoded data to at least one resource element wherein the resource element can be the same resource element of resource block 206 or a different resource element of resource block 206. In an exemplary embodiment, wireless devices 102, 104 can assign the encoded data to a plurality or set of resource elements of resource block 206.

Each resource element 212 (or symbol) can comprise a plurality of bits where the number of bits assigned per resource element 212 can be based on a signal condition and a modulation scheme. For example, when radio conditions of the wireless device are excellent, 64-QAM (Quadrature Amplitude Modulation) can be used to assign six bits per resource element. When radio conditions are less than excellent, 16-QAM or 1-QPSK (Quadrature Phase Shift Keying) modulation can be used to assign four or two bits per resource element. In an exemplary embodiment, the resource elements can be assigned to the resource block after the first masking code and the second masking code are multiplied with the data transmitted from wireless devices 102, 104, respectively.

As illustrated in FIG. 2, resource block 206 can comprise twelve subchannels 208, 210 where each subchannel comprises seven resource elements 212. Resource elements 212 can include the data to be transmitted between wireless devices 102, 104 and a network node such as access node 106 Alternatively, resource elements 212 can include reference signals. Reference signals can be dynamically assigned to subchannels 208, 210 or could be assigned based on a predetermined pattern. The devices that receive the resource blocks can use the reference signals for synchronization purposes, to measure signal quality, and/or to identify the device transmitting the resource block.

Figure 3:
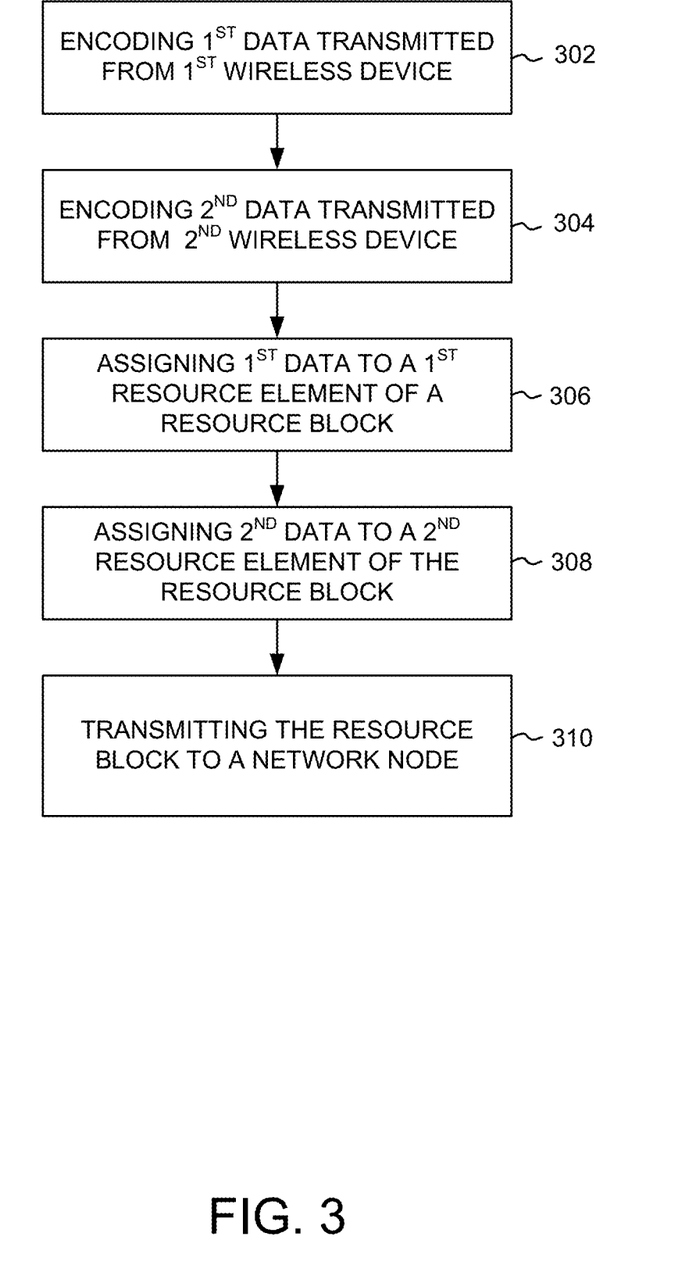
FIG. 3 illustrates an exemplary method of assigning resources in a wireless communication network.

FIG. 3 illustrates a flow chart of an exemplary method of assigning resources in a wireless communication network. The method will be discussed with reference to the exemplary communication system 100 illustrated in FIG. 1 and the exemplary data transmission frame 202 illustrated in FIG. 2. However, the method can be implemented with any suitable communication system. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

A first wireless device can encode data to be transmitted to a network node at 302. For example, wireless device 102 can multiply data to be transmitted to access node 106 with a first masking code to encode the data to be transmitted from wireless device 102. At 304, a second wireless device can encode data to be transmitted to the network node. For example, wireless device 104 can multiply data to be transmitted to access node 106 with a second masking code different from the first masking code in order to encode the data to be transmitted from wireless device 104. The first and second masking codes can be used to scramble or encrypt the data addressed to wireless devices 102, 104. In an exemplary embodiment, the first masking code can be XOR'd with data to be transferred from wireless device 102 such that the data is secure and cannot be decoded by any device except the network node and/or wireless device 102. Likewise, the second masking code which is different from the first masking code can be XOR's with data to be transmitted from wireless device 104 such that the data is secure and cannot be decoded by any device except the network node and/or wireless device 104. The masking codes can be based on signal characteristics associated with wireless devices 102, 104. In an exemplary embodiment, when the signal characteristics associated with wireless devices 102, 104 meet a threshold, the first and second masking codes can be generated based on the signal characteristics of each wireless device 102, 104. The first masking code associated with wireless device 102 can be orthogonal to the second masking code associated with wireless device 104.

In an exemplary embodiment, the masking scheme used to encode the data addressed to the first wireless device can be different from the masking scheme used to encode the data addressed to the second wireless device such that the first wireless device cannot decode data that has been encoded for the second wireless device. In other words, each masking scheme can be unique to the each wireless device. While the resource block comprising the encoded data to be transmitted from the first wireless and encoded data to be transmitted from the second wireless device is transmitted to a network node such as access node 106 such that the network node can decode the resource block based on the unique masking schemes such that only the data transmitted from wireless device 102 can be generated by multiplying the received resource block by the first masking scheme and only the data transmitted from wireless device 104 can be generated by multiplying the received resource block by the second masking scheme.

The first wireless device can assign the encoded first data to a first resource element of a resource block at 306 and at 308 the second wireless device can assign the encoded second data to a second resource element of the resource block. For example, wireless device 102 can modulate the encoded data such that a plurality number of bits of the encoded data are assigned to a resource element 212, where the encoded data to be transmitted from wireless device 102 is assigned to a resource element different from the resource element comprising encoded data to be transmitted from wireless device 104. The resource element comprising encoded data to be transmitted from the first wireless device can be assigned to the same or different subcarriers as the resource element comprising encoded data transmitted from the second wireless device within resource block 206. For example, the resource element comprising encoded data transmitted from wireless device 102 and the resource element comprising encoded data transmitted from wireless device 104 can both be assigned to subcarrier 208. Alternatively, the resource element comprising encoded data transmitted from wireless device 102 can be assigned to subcarrier 208 and the resource element comprising encoded data transmitted from wireless device 104 can be assigned to subcarrier 210.

In another exemplary embodiment, the wireless devices 102, 104 can assign the encoded data to the same resource elements of a single resource block. For example, wireless device 102 can assign the encoded data to be transmitted from wireless device 102 to access node 106 and the encoded data to be transmitted from wireless device 104 to access node to the same resource element 212 of resource block 206.

At 310, the resource block comprising the first resource element and the second resource element can be transmitted from the first wireless device and the second wireless device to the network node. For example, wireless devices 102, 104 can transmit a signal comprising frame 202 to access node 106. Access node 106 can decode the resource block 206 based on the masking scheme used to encode the data transmitted from wireless device 102 to generate the data transmitted from wireless device 102 and access node 106 can decode the resource block 206 based on the masking scheme used to encode the data transferred from wireless device 104 to generate the data transferred from wireless device 104.

Figure 4:
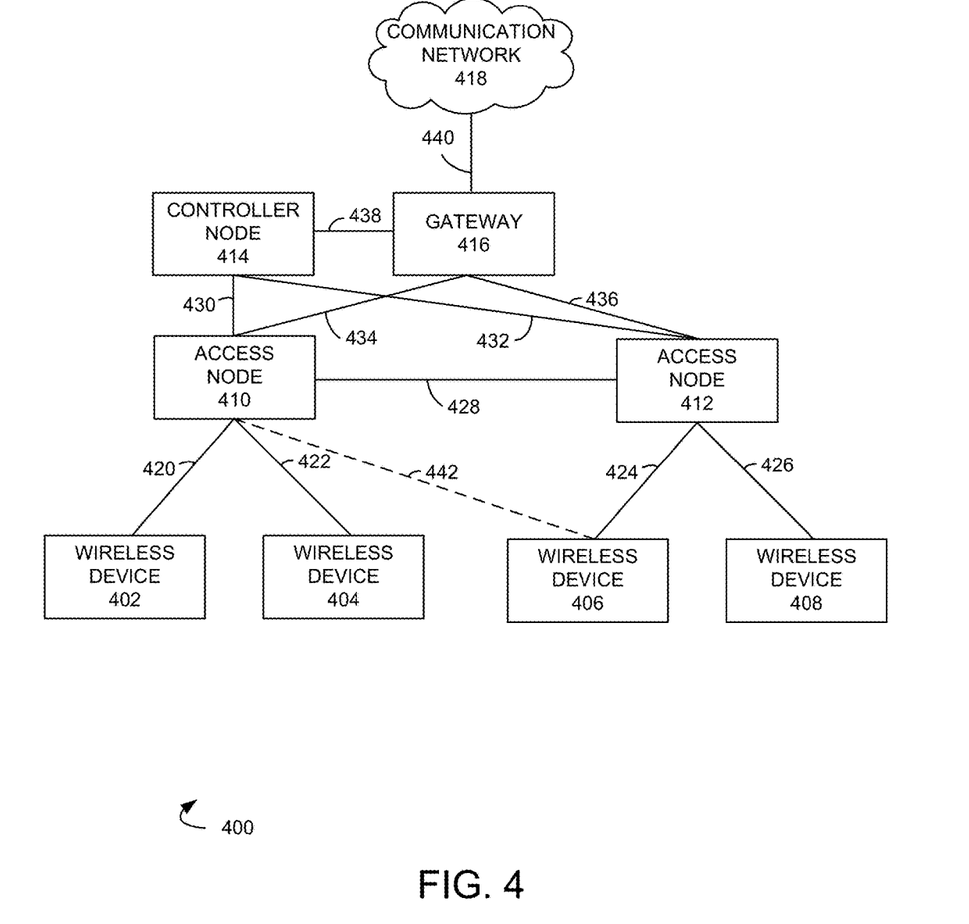
FIG. 4 illustrates another exemplary communication system to assign resources in a wireless communication network.

FIG. 4 illustrates an exemplary communication system 400 for assigning resources in a wireless communication network. Communication system 400 can comprise wireless devices 402, 404, 406, 408, access nodes 410, 412, controller node 414, gateway 416, and communication network 418. Other network elements may be present in the communication system 400 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access nodes 410, 412 and communication network 418, which are omitted for clarity, including additional processing nodes, routers, gateways, and physical and/or wireless data links for carrying data among the various network elements.

Wireless devices 402, 404, 406, 408 can be any device configured to communicate over communication system 400 using a wireless interface. For example, wireless devices 402, 404, 406, 408 can include a remote terminal unit, a cell phone, a smart phone, a computing platform such as a laptop, palmtop, or a tablet, a personal digital assistant, or an internet access device, and combinations thereof. It is noted that while four wireless devices are illustrated in FIG. 4 as being in communication with access nodes 410, 412, any number of wireless devices can be implemented according to various exemplary embodiments disclosed herein.

The wireless interface of wireless devices 402, 404, 406, 408 can include one or more transceivers for transmitting and receiving data over communication system 400. Each transceiver can be associated with a different frequency bands, the same or different radio access technologies, and/or the same or different network providers. For example, wireless devices 402, 404, 406, 408 can include a transceiver associated with at least one wireless cellular protocol and/or other types of wireless communication. For example, a transceiver can be associated with code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (WiFi), Bluetooth, Zigbee, infrared data association (IrDA), etc.

Wireless device 402 can be in communication with access node 410 through communication link 420. Wireless device 404 can be in communication with access node 410 through communication link 422. Wireless device 406 can be in communication with access node 412 through communication link 424. Wireless device 408 can be in communication with access node 412 through communication link 426. Links 420, 422, 424, 426 can use various communication media, such as air, space, metal, optical fiber, or some other signal propagation path—including combinations thereof. Communication links 420, 422, 424, 426 may comprise many different signals sharing the same link. Communication links 420, 422, 424, 426 could include multiple signals operating in a single "airpath" comprising beacon signals, user communications, communication sessions, overhead communications, frequencies, timeslots, transportation ports, logical transportation links, network sockets, packets, or communication directions. For example, user communications between wireless devices 402, 404 and access node 410 could share the same representative wireless link, but be transferred over different communication sessions, frequencies, timeslots, packets, ports, sockets, logical transport links, or in different directions—including combinations thereof.

Wireless devices 402, 404, 406, 408 can communicate information over system 400 using various communication services. These services can include various voice and/or data services and applications. For example, mobile voice services, mobile data services, push-to-talk services, internet services, web browsing, email, pictures, picture messaging, video, video messaging, audio, voicemail, music, MP3's, ring tones, stock tickers, new alerts, etc.

Access nodes 410, 412 can be any network node configured to provide communication between wireless devices 402, 404, 406, 408 and communication network 418. For example, access nodes 410, 412 can be selected from a base transceiver station, a radio base station, an eNodeB device, or an enhanced eNodeB device, SCADA control host, or the like. It is noted that while two access nodes 410, 412 are illustrated in FIG. 4, any number of access nodes can be implemented within system 400.

Access nodes 410, 412 can comprise a processor and associated circuitry to execute or direct the execution of computer-readable instructions to obtain information. Access nodes 410, 412 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 410, 412 can receive instructions and other input at a user interface.

Controller node 414 can be any network node configured to communicate control information over system 400. Controller node 414 can be a standalone computing device, computing system, or network component, and can be accessible, for example, by a wired or wireless connection, or through an indirect connection such as through a computer network or communication network. For example, controller node 414 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 414 is not limited to any specific technology architecture, such as Long Term Evolution (LTE) and can be used with any network architecture and/or protocol.

Controller node 414 can comprise a processor and associated circuitry to execute or direct the execution of computer-readable instructions to obtain information. Controller node 414 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Control node 414 can receive instructions and other input at a user interface.

Gateway 416 can be any network node configured to interface with other network devices using various protocols. Gateway 416 can communicate user data over system 400. Gateway 416 can be a standalone computing device, computing system, or network component, and can be accessible, for example, by a wired or wireless connection, or through an indirect connection such as through a computer network or communication network. For example, gateway 416 can include a serving gateway (SGW) and/or a public data network gateway (PGW), etc. One of ordinary skill in the art would recognize that gateway 416 is not limited to any specific technology architecture, such as Long Term Evolution (LTE) and can be used with any network architecture and/or protocol.

Gateway 416 can comprise a processor and associated circuitry to execute or direct the execution of computer-readable instructions to obtain information. Gateway 416 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway 416 can receive instructions and other input at a user interface.

Access node 410 can be in communication with access node 412 through communication link 428. Access node 410 can be in communication with controller node 414 through communication link 430. Access node 412 can be in communication with controller node 414 through communication link 432. Access node 410 can be in communication with gateway 416 through communication link 434. Access node 412 can be in communication with gateway 416 through communication link 436. Controller node 414 can be in communication with gateway 416 through communication link 438. Gateway 416 can be in communication with communication network 418 through communication link 440. Communication links 428, 430, 432, 434, 436, 438, 440 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 428, 430, 432, 434, 436, 438, 440 can be a direct link or might include various equipment, intermediate components, systems, and networks.

Communication network 418 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 418 can be capable of carrying data, for example, to support voice, push-to-talk, and data communications by a wireless device such as wireless devices 402, 404, 406, 408. Wireless network protocols can comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 418 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 418 can also comprise additional base stations, controller nodes, telephony switches, internet routers, network gateways, computer systems, communication links, or some other type of communication equipment, and combinations thereof.

Data communicated within a network can be assigned transmission resources using an organization based on resource elements or symbols. Transmission resources can be assigned or scheduled using various channel access methods such as frequency division multiple access (FDMA), time division multiple access (TDMA), packet mode multiple access, code division multiple access (CDMA), spread spectrum multiple access (SSMA), space division multiple access (SDMA), etc.

In operation, data communicated within system 400 can be assigned resources such that data addressed to a plurality of wireless devices can be assigned within the same resource block. The resources can be assigned based on the signal conditions of the plurality of wireless devices. For example, a network node such as access node 410 can determine the signal conditions of wireless devices 402, 404. When the signal conditions of wireless devices 402, 404 meet a threshold, the network node can generate a masking scheme based on the signal condition. For instance, when the signal condition of wireless device 402 is similar to the signal condition of wireless device 404, access node 410 can generate a first masking scheme for wireless device 402 and a second masking scheme for wireless device 404 where the masking schemes can be different. Likewise, access node 412 can determine the signal conditions of wireless devices 406, 408. When the signal conditions of wireless devices 406, 408 meet a threshold, access node 412 can generate a masking scheme for wireless device 406 and a masking scheme for wireless device 408. The masking schemes can comprise a masking code that is multiplied by the data addressed to the respective wireless device. In an exemplary embodiment, the masking code can be XOR'd with the data such that the data is secure and cannot be decoded by any device except the device receiving the data. In an exemplary embodiment, the masking codes can be orthogonal.

Access node 410 can receive data addressed to wireless devices 402, 404 from gateway 416 and control information associated with the data addressed to wireless devices 402, 404 from controller node 414. Access node 410 can encode both the data addressed to wireless devices 402, 404 and the associated control information. The masking scheme used to encode the data addressed to wireless device 402 can be different from the masking scheme used to encode the data addressed to wireless device 404.

When the access node 410 assigns the data addressed to the wireless devices to different resource elements within the same resource block, access node 410 can compare the encoded data to a resource element threshold to determine whether the encoded data would fit within a single resource block. For example, when the number of resource elements that the encoded data addressed to wireless device 402 and the encoded data addressed to wireless device 404 would generate is less than or equal to the resource element threshold, access node 410 can assign the encoded data addressed to wireless device 402 and the encoded data addressed to wireless device 404 to a single resource block. When the number of resource elements is greater than the resource element threshold, the access node 410 can assign the encoded data such that a minimal number of resource blocks is needed to transmit all data. In addition, access node 410 can assign the encoded data addressed to wireless devices 402, 404 to resource elements within a single resource block where the resource elements associated with the respective wireless devices can be in the same subcarrier or different subcarriers within the resource block. In an exemplary embodiment, the data to be transmitted to wireless devices 402, 404, 406, and/or 408 can be assigned to one or more resource elements of a single resource block. When the data is assigned to a plurality of resource elements, the resource elements can be a set of resource elements such that the resource elements are adjacent within the resource block. Alternatively, the data to be transmitted can be assigned to a plurality of resource elements that are non-sequential such that one or more of the resource elements are not adjacent within the resource block.

Access node 410 can transmit a first message indicative of the masking scheme used to encode the data addressed to wireless device 402 and a second message indicative of the masking scheme used to encode the data addressed to wireless device 404. The messages indicative of the masking schemes sent to the wireless devices 402, 404 can be transmitted within a communication link configuration message such as a RRC Config message. After the resource block is transmitted over a wireless interface to wireless device 402 and wireless device 404, wireless device 402 can decode the resource block based on the message indicative of the masking scheme used to encode the data addressed to wireless device 402 to generate the data addressed to wireless device 402 and wireless device 404 can decode the resource block based on the message indicative of the masking scheme used to encode the data addressed to wireless device 404 to generate the data addressed to wireless device 404.

Similar to the method described above, access node 412 can receive data addressed to wireless devices 406, 408 from gateway 416 and control information associated with the data addressed to wireless devices 406, 408 from controller node 414. Access node 412 can encode both the data addressed to wireless devices 406, 408 and the associated control information by multiplying the data with a masking code associated with the respective wireless device 406, 408. The masking scheme used to encode the data addressed to wireless device 406 can be different from the masking scheme used to encode the data addressed to wireless device 408.

In an exemplary embodiment, access node 410 and access node 412 can communicate over communication link 428 to determine to handover wireless device 406 to access node 410. After performing a handover, wireless device 406 can establish a communication link 442 with access node 410. The data addressed to wireless device 406 can be encoded by access node 412 and transmitted to access node 410 during the handover process. Alternatively, access node 410 can receive the data addressed to wireless device 406 from controller node 414 and gateway 416 and generate a masking scheme based on the signal condition of wireless device 406 and encode the data addressed to wireless device 406. Access node 410 can assign the encoded data addressed to wireless devices 402, 404, and 406 into a single resource block.

Figure 5:
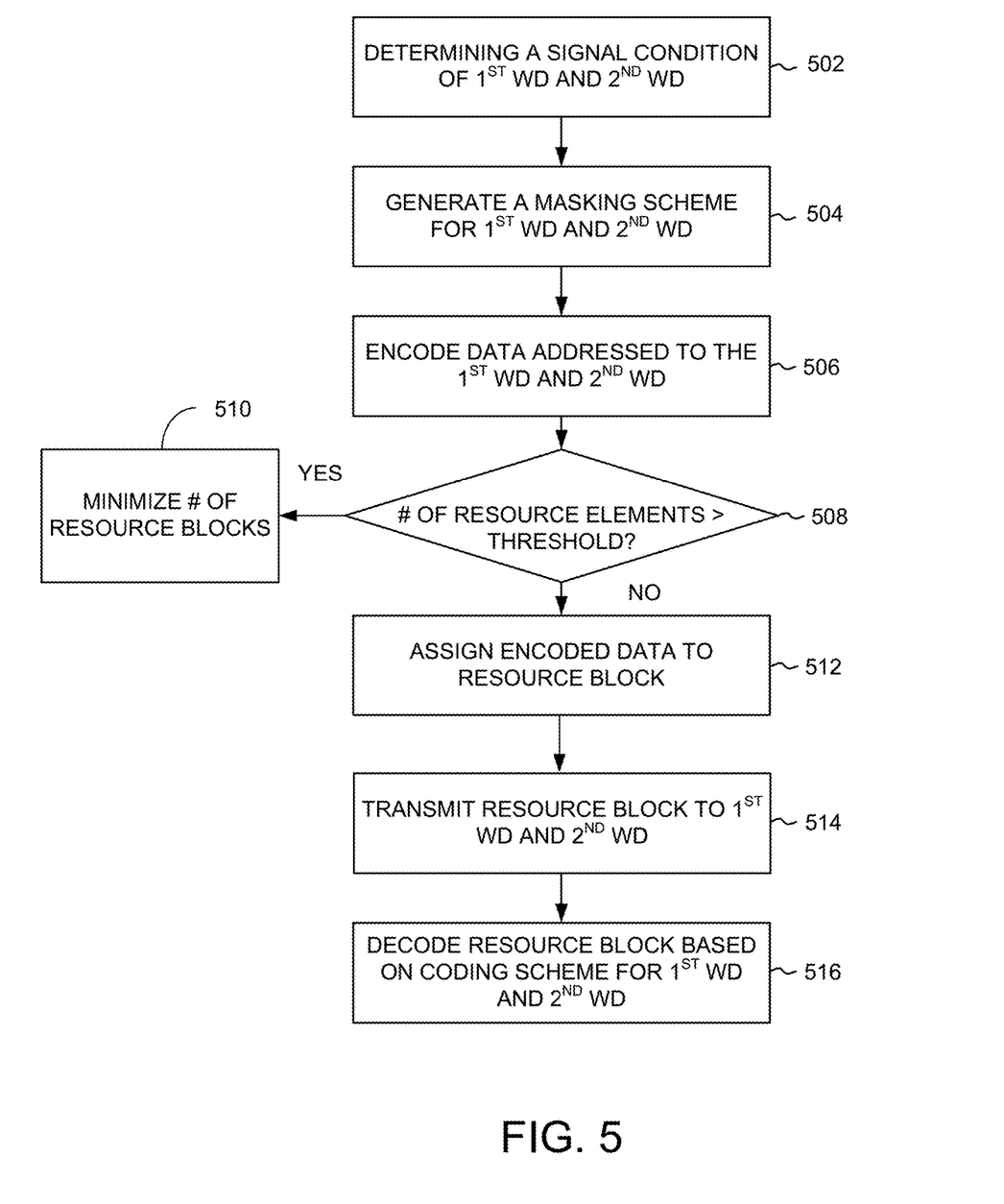
FIG. 5 illustrates another exemplary method of assigning resources in a wireless communication network.

FIG. 5 illustrates a flow chart of an exemplary method of assigning resources in a wireless communication network. The method will be discussed with reference to the exemplary communication system 400 illustrated in FIG. 4. However, the method can be implemented with any suitable communication system. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

A network node can determine a signal condition of a first wireless device and a signal condition of a second wireless device at 502. For example, access node 414 can receive a message indicative of the signal condition of wireless device 402 and a message indicative of the signal condition of wireless device 404. That message can be in response to a request from access node 410 or sent automatically from wireless devices 402, 404 at a predetermined time or interval. In addition, the network node can determine whether the signal conditions of the first wireless device and the second wireless device are similar. For example, access node 410 can compare the signal conditions of wireless devices 402, 404 to a threshold and when the signal conditions meet the threshold (i.e. the signal conditions are the same or within a range of acceptable thresholds), the access node 410 can proceed to generate a masking scheme for the wireless devices 402, 404.

At 504, the network node can generate a masking scheme for the first wireless device and a masking scheme for the second wireless device. The masking schemes can be used to scramble or encrypt the data addressed to the first and second wireless devices. Each masking scheme can be based on the signal condition of each wireless device. For example, access node 410 can generate a first masking scheme for data addressed to wireless device 402 and a second masking scheme for data addressed to wireless device 404 based on the signal conditions of wireless devices 402, 404. The first masking scheme and the second masking scheme can be different.

The network node can encode the data addressed to the wireless devices using the generated masking schemes at 506. For example, access node 410 can encode the data addressed to wireless device 402 by multiplying the data addressed to wireless device 402 with the first masking scheme and can encode the data addressed to wireless device 404 by multiplying the data addressed to wireless device 404 with the second masking scheme. In an exemplary embodiment, the masking codes can be XOR'd with the data addressed to the wireless devices. In addition, the network node can determine the number of resource elements the encoded data will occupy.

At 508, the network node can compare the number of resource elements the encoded data will occupy to a threshold. For example, access node 410 can compare the encoded data addressed to wireless device 402 and the encoded data addressed to wireless device 404 to a resource element threshold where the resource element threshold represents the amount of encoded data that will fit within a single resource block.

When the number of resource elements that the encoded data addressed to the wireless devices is greater than the threshold, the network node can determine a minimum number of resource blocks into which the encoded data addressed to the wireless devices would fit at 510. For example, when the encoded data addressed to wireless device 402 would fit within a whole resource block and portion of a second resource block and the encoded data addressed to wireless device 404 would fit within a portion of a second resource block, access node 410 can assign the portion of the encoded data addressed to wireless device 402 and the portion of the encoded data addressed to wireless device 404 to a single resource block to minimize the number of resource blocks transmitted between access node 410 and wireless devices 402, 404.

When the number of resource elements that the encoded data addressed to wireless device 402 and the encoded data addressed to wireless device 404 would occupy is less than or equal to the resource element threshold, the network node can assign the encoded data to a single resource block at 512. For example, access node 410 can assign resource elements to the data addressed to wireless device 402 and resource elements to the data addressed to wireless device 404 where the assigned resource elements can be in the same subcarrier of the resource block or different subcarriers of the resource block.

At 514, the network node can transmit the resource block to the wireless devices. For example, access node 410 can send the resource block comprising resource elements for data addressed to wireless device 402 and resource elements for data addressed to wireless device 404 to both wireless devices 402, 404. In addition, the network node can transmit messages indicative of the masking scheme used to encode the data to the individual wireless devices. For example, access node 410 can transmit a first message indicative of the masking scheme used to encode the data addressed to wireless device 402 and a second message indicative of the masking scheme used to encode the data addressed to wireless device 404. The messages indicative of the masking schemes can be transmitted within a communication link configuration message such as a RRC Config message.

The network node can instruct the wireless devices to decode the resource block based on the masking schemes used to encode the data addressed to the wireless devices at 516. For example, access node 410 can instruct wireless devices 402, 404 to decode the message based on the messages indicative of the masking schemes. Wireless device 402 can decode the resource block based on the message indicative of the masking scheme used to encode the data addressed to wireless device 402 to generate the data addressed to wireless device 402 from the resource block and wireless device 404 can decode the resource block based on the message indicative of the masking scheme used to encode the data addressed to wireless device 404 to generate the data addressed to wireless device 404 from the resource block.

Figure 6:
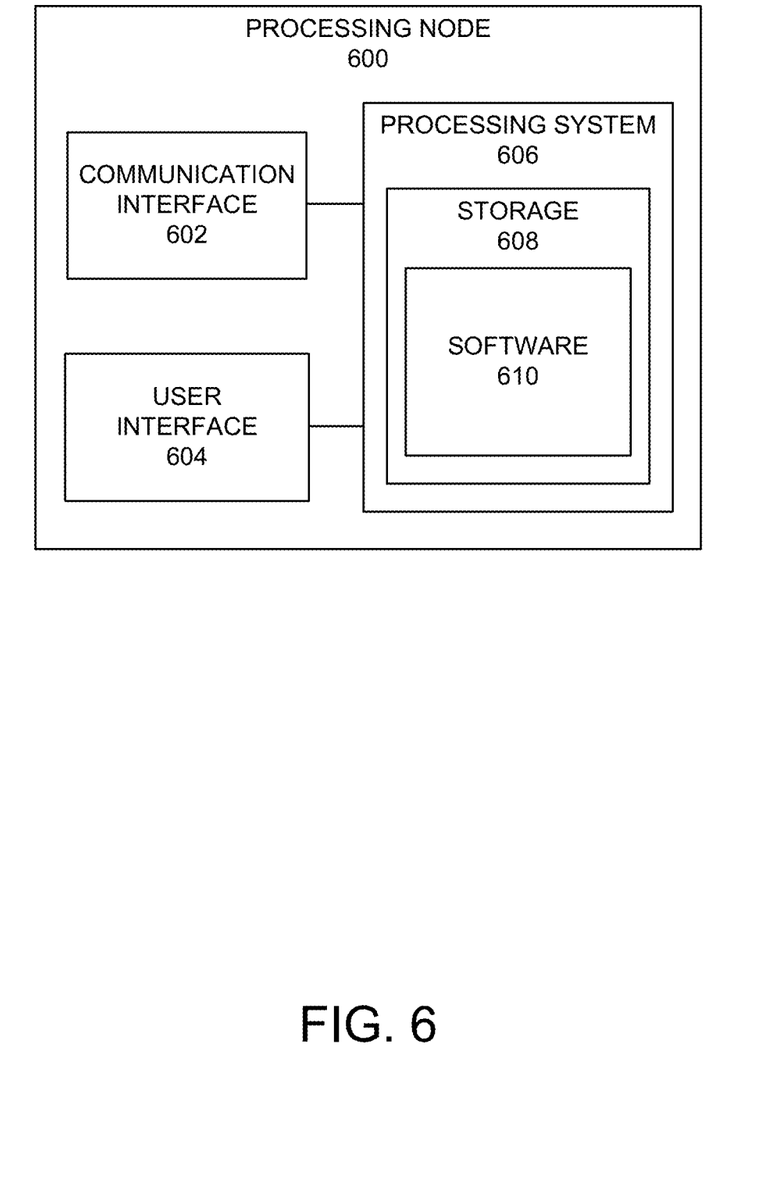
FIG. 6 illustrates an exemplary processing node according to an exemplary embodiment of the present disclosure.

FIG. 6 illustrates an exemplary processing node 600 in a communication system. Processing node 600 comprises communication interface 602, user interface 604, and processing system 606 in communication with communication interface 602 and user interface 604. Processing node 600 is capable of monitoring communications in a communication network. Processing system 606 includes storage 608, which can comprise a disk drive, flash drive, memory circuitry, or other memory device. Storage 608 can store software 610 which is used in the operation of the processing node 600. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access nodes 106, 410, 412, controller nodes 108, 414, and gateway 416. Processing node 600 can also be an adjunct or component of a network element, such as an element of access nodes 106, 410, 412, controller nodes 108, 414, and gateway 416. Processing node 600 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of assigning resources in a wireless communication system, comprising:
   selecting, from a plurality of wireless devices, a first wireless device and a second wireless device each with a signal condition that meets a signal condition threshold;
   encoding first data addressed to the first wireless device by multiplying the first data with a first masking code, the first data being encoded based on the signal condition of the first wireless device;
   encoding second data addressed to the second wireless device by multiplying the second data with a second masking code different from the first masking code, the second data being encoded based on the signal condition of the second wireless device;
   when the encoded first data and the encoded second data exceeds a resource element threshold, assigning the encoded first data and the encoded second data to a plurality of resource blocks in a data transmission frame,
      wherein each resource block in the plurality of resource blocks comprises a plurality of frequency subcarriers over a predetermined time period, and
      wherein the assignment minimizes a total number of resource blocks, in the data transmission frame, assigned to the encoded first data and the encoded second data; and
   when the encoded first data and the encoded second data does not exceed the resource element threshold, assigning the encoded first data and the encoded second data within a single resource block of the plurality of resource blocks.

2. The method of claim 1, further comprising:
   assigning the encoded first data to a first resource element and the encoded second data to a second resource element when the encoded first data and the encoded second data meets or exceeds the resource element threshold.

3. The method of claim 1, further comprising:
   generating a first masking scheme to encode the first data addressed to the first wireless device based on a signal condition of the first wireless device;
   generating a second masking scheme to encode the second data addressed to the second wireless device based on a signal condition of the second wireless device;
   encoding the first data based on the first masking scheme; and
   encoding the second data based on the second masking scheme.

4. The method of claim 3, further comprising:
   transmitting a first message indicative of the first masking scheme to the first wireless device;
   transmitting a second message indicative of the second masking scheme to the second wireless device;
   instructing the first wireless device to decode the resource block using the first message indicative of the first masking scheme; and
   instructing the second wireless device to decode the resource block using the second message indicative of the second masking scheme.

5. The method of claim 4, wherein the first message indicative of the first masking scheme is transmitted within a first communication link configuration message and the second message indicative of the second masking scheme is transmitted within a second communication link configuration message.

6. The method of claim 1, wherein the resource element is within a first subcarrier of the resource block.

7. The method of claim 1, wherein the resource element and a second resource element are within one subcarrier.

8. The method of claim 1, further comprising:
encoding third data addressed to a third wireless device by multiplying the third data with a third masking code different from the first masking code and the second masking code;
determining whether the encoded first data, the encoded second data, and the encoded third data meet a resource element threshold;
assigning the encoded third data to the resource element of the resource block when the encoded first data, the encoded second data, and the encoded third data do not meet the resource element threshold; and
transmitting the resource block to the first wireless device, the second wireless device, and the third wireless device.

9. The method of claim 8, further comprising:
determining a signal condition of the third wireless device;
generating a third masking scheme to encode the third data addressed to the third wireless device based on the signal condition of the third wireless device;
encoding the third data based on the third masking scheme;
transmitting a third message indicative of the third masking scheme to the third wireless device; and
instructing the third wireless device to decode the resource block using the third message indicative of the third masking scheme.

10. A system for assigning resources in a wireless communication system, comprising:
a processing node configured to:
select, from a plurality of wireless devices, a first wireless device and a second wireless device each with a signal condition that meets a signal condition threshold;
encode first data addressed to the first wireless device by multiplying the first data with a first masking code, the first data being encoded based on the signal condition of the first wireless device;
encode second data addressed to the second wireless device by multiplying the second data with a second masking code different from the first masking code, the second data being encoded based on the signal condition of the second wireless device;
when the encoded first data and the encoded second data exceeds a resource element threshold, assign the encoded first data and the encoded second data to a plurality of resource blocks in a data transmission frame,
wherein each resource block in the plurality of resource blocks comprises a plurality of frequency subcarriers over a predetermined time period, and
wherein the assignment minimizes a total number of resource blocks, in the data transmission frame, assigned to the encoded first data and the encoded second data addressed to the first wireless device and the second wireless device; and
when the encoded first data and the encoded second data does not exceed the resource element threshold, assign the encoded first data and the encoded second data within a single resource block of the plurality of resource blocks.

11. The system of claim 10, wherein the processing node is further configured to:
assign the encoded first data to a first resource element and the encoded second data to a second resource element when the encoded first data and the encoded second data meets or exceeds the resource element threshold.

12. The system of claim 10, wherein the processing node is further configured to:
generate a first masking scheme to encode the first data addressed to the first wireless device based on a signal condition of the first wireless device;
generate a second masking scheme to encode the second data addressed to the second wireless device based on a signal condition of the second wireless device;
encode the first data based on the first masking scheme; and
encode the second data based on the second masking scheme.

13. The system of claim 12, wherein the processing node is further configured to:
transmit a first message indicative of the first masking scheme to the first wireless device;
transmit a second message indicative of the second masking scheme to the second wireless device;
instruct the first wireless device to decode the resource block using the first message indicative of the first masking scheme; and
instruct the second wireless device to decode the resource block using the second message indicative of the second masking scheme.

14. The system of claim 13, wherein the first message indicative of the first masking scheme is transmitted within a first communication link configuration message and the second message indicative of the second masking scheme is transmitted within a second communication link message.

15. The system of claim 10, wherein the resource element is within a first subcarrier of the resource block.

16. The system of claim 10, wherein the resource element and a second resource element are within one subcarrier.

17. A method of assigning resources in a wireless communication system, comprising:
encoding first data addressed to a first wireless device by multiplying the first data with a first masking code;
encoding second data addressed to a second wireless device by multiplying the second data with a second masking code different from the first masking code, wherein the first wireless device and the second wireless device are each selected from a plurality of wireless devices whose signal strengths meet a signal strength threshold;
when the encoded first data and the encoded second data meets or exceeds a resource element threshold, assigning the encoded first data and the encoded second data to a plurality of resource blocks in a data transmission frame,
wherein each resource block in the plurality of resource blocks comprises a plurality of frequency subcarriers over a predetermined time period, and
wherein the assignment reduces a total number of resource blocks, in the data transmission frame, assigned to the encoded first data and the encoded second data addressed to the first wireless device and the second wireless device; and when the encoded first data and the encoded second data does not meet or exceed the resource element threshold, assigning the encoded first data and the encoded second data within a single resource block of the plurality of resource blocks.

18. The method of claim 17, further comprising:

generating a first masking scheme to encode the first data addressed to the first wireless device based on a signal condition of the first wireless device;

generating a second masking scheme to encode the second data addressed to the second wireless device based on a signal condition of the second wireless device;

encoding the first data based on the first masking scheme;

encoding the second data based on the second masking scheme;

transmitting a first message indicative of the first masking scheme to the first wireless device;

transmitting a second message indicative of the second masking scheme to the second wireless device;

instructing the first wireless device to decode the resource block using the first message indicative of the first masking scheme; and instructing the second wireless device to decode the resource block using the second message indicative of the second masking scheme.

* * * * *